(12) United States Patent
Manzoor

(10) Patent No.: US 10,190,654 B2
(45) Date of Patent: Jan. 29, 2019

(54) APPARATUS FOR A DRIVE SYSTEM HAVING A CARTRIDGE HOUSING ONE OR MORE ELASTOMER MEMBERS

(71) Applicant: Suhale Manzoor, Plymouth, MI (US)
(72) Inventor: Suhale Manzoor, Plymouth, MI (US)
(73) Assignee: Dayco IP Holdings, LLC, Troy, MI (US)
(*) Notice: Subject to any disclaimer, the term of this patent is extended or adjusted under 35 U.S.C. 154(b) by 112 days.

(21) Appl. No.: 14/843,415
(22) Filed: Sep. 2, 2015

(65) Prior Publication Data
US 2016/0061287 A1 Mar. 3, 2016

Related U.S. Application Data
(60) Provisional application No. 62/106,799, filed on Jan. 23, 2015, provisional application No. 62/044,540, (Continued)

(51) Int. Cl.
*F16F 15/30* (2006.01)
*F16H 55/36* (2006.01)
*B60K 25/02* (2006.01)

(52) U.S. Cl.
CPC .............. *F16F 15/30* (2013.01); *B60K 25/02* (2013.01); *F16H 55/36* (2013.01); *B60K 2025/022* (2013.01); *F16H 2055/366* (2013.01)

(58) Field of Classification Search
CPC ...... F16F 15/30; F16F 15/124; F16F 15/1245; F16F 15/126; F16F 15/136;
(Continued)

(56) References Cited

U.S. PATENT DOCUMENTS 1,928,119 A * 9/1933 Vargha ................ F16F 15/1442
74/574.2

4,355,990 A * 10/1982 Duncan, Jr. ............... F16D 3/68
464/74
(Continued)

FOREIGN PATENT DOCUMENTS

CN 1682043 10/2005
EP 0790440 A1 6/1997
(Continued)

OTHER PUBLICATIONS

PCT, International Search Report and Written Opinion, International Application No. PCT/US2015/048122 (dated Nov. 27, 2015).
(Continued)

*Primary Examiner* — Daniel D Yabut
(74) *Attorney, Agent, or Firm* — FisherBroyles, LLP; Susan M. Oiler

(57) ABSTRACT

Torsional vibration dampers for FEADs are disclosed that include a hub having a sleeve defining a bore for receiving a shaft and an outer annular ring spaced radially outward from the sleeve, thereby defining an annular receptacle, a component for rotation with the hub having an inner annular ring disposed between the sleeve and the outer annular ring of the hub, and an annular cartridge seated in the annular receptacle between the inner annular ring of the component for rotation with the hub and the sleeve or outer annular ring of the hub. The annular cartridge defines a first annular groove having a generally C-shaped or U-shaped cross-sectional profile open radially outward, and has a first elastomer member seated therein in compression, thereby operatively coupling the component for rotation with the hub to the hub. The component may be a pulley body or an inertia member.

20 Claims, 11 Drawing Sheets
(3 of 11 Drawing Sheet(s) Filed in Color)

Related U.S. Application Data filed on Sep. 2, 2014, provisional application No. 62/044,534, filed on Sep. 2, 2014.

(58) Field of Classification Search
CPC .... F16F 15/1442; F16F 15/1435; F16F 1/371; F16F 1/3849; F16F 1/3835; F16F 1/3876; F16F 1/387; F16F 1/3732; F16F 1/3856; F16H 2055/366; F16H 55/36; Y10T 74/2131; Y10T 74/2125; Y10T 74/2132; Y10T 74/2119; Y10T 74/2121
See application file for complete search history.

(56) References Cited

U.S. PATENT DOCUMENTS

| | | | | |
|---|---|---|---|---|
| 4,709,796 | A * | 12/1987 | Uenohara | F16D 3/68 192/205 |
| 4,717,370 | A * | 1/1988 | Rohrig | F16F 15/124 474/161 |
| 5,425,287 | A * | 6/1995 | Beattie | F16F 15/1442 464/180 |
| 5,591,093 | A | 1/1997 | Asai et al. | |
| 5,931,052 | A | 8/1999 | Zhao et al. | |
| 5,979,390 | A * | 11/1999 | Depp | F01L 1/02 123/192.1 |
| 5,988,015 | A * | 11/1999 | Riu | F16F 15/124 464/90 |
| 7,658,127 | B2 | 2/2010 | Crist | |
| 7,892,124 | B2 | 2/2011 | Hodjat et al. | |
| 8,302,753 | B2 | 11/2012 | Antchak et al. | |
| 8,313,400 | B2 | 11/2012 | Serkh et al. | |
| 8,534,438 | B2 | 9/2013 | Antchak et al. | |
| 2004/0159507 | A1 * | 8/2004 | Allport | F16D 3/12 188/130 |
| 2008/0076611 | A1 * | 3/2008 | Fisher | F02B 67/06 474/178 |
| 2009/0000422 | A1 * | 1/2009 | Christenson | F16F 7/108 74/574.4 |
| 2009/0078078 | A1 * | 3/2009 | Manzoor | F16F 15/1428 74/574.4 |
| 2012/0015768 | A1 * | 1/2012 | Serkh | F16H 55/36 474/94 |
| 2012/0094791 | A1 * | 4/2012 | Lee | F16F 15/126 474/94 |
| 2013/0068065 | A1 | 3/2013 | Manzoor et al. | |
| 2013/0284139 | A1 | 10/2013 | Staley | |

FOREIGN PATENT DOCUMENTS

| | | |
|---|---|---|
| EP | 0790440 | 8/1997 |
| EP | 2392834 | 12/2011 |
| EP | 2392834 A1 | 12/2011 |
| JP | 2006-177525 | 7/2006 |
| JP | 2008008305 | 1/2008 |
| JP | 2011001975 | 1/2011 |
| JP | 5257617 | 8/2013 |

OTHER PUBLICATIONS

CN, First Office Action with English Translation; Chinese Application No. 2015800472895 (dated Jun. 22, 2018).

CN, Search Report with English Translation; Chinese Application No. 2015800472895 (dated Jun. 22, 2018).

EP, European Supplemental Search Report; European Application No. 15837761.4 (dated Mar. 28, 2018).

\* cited by examiner

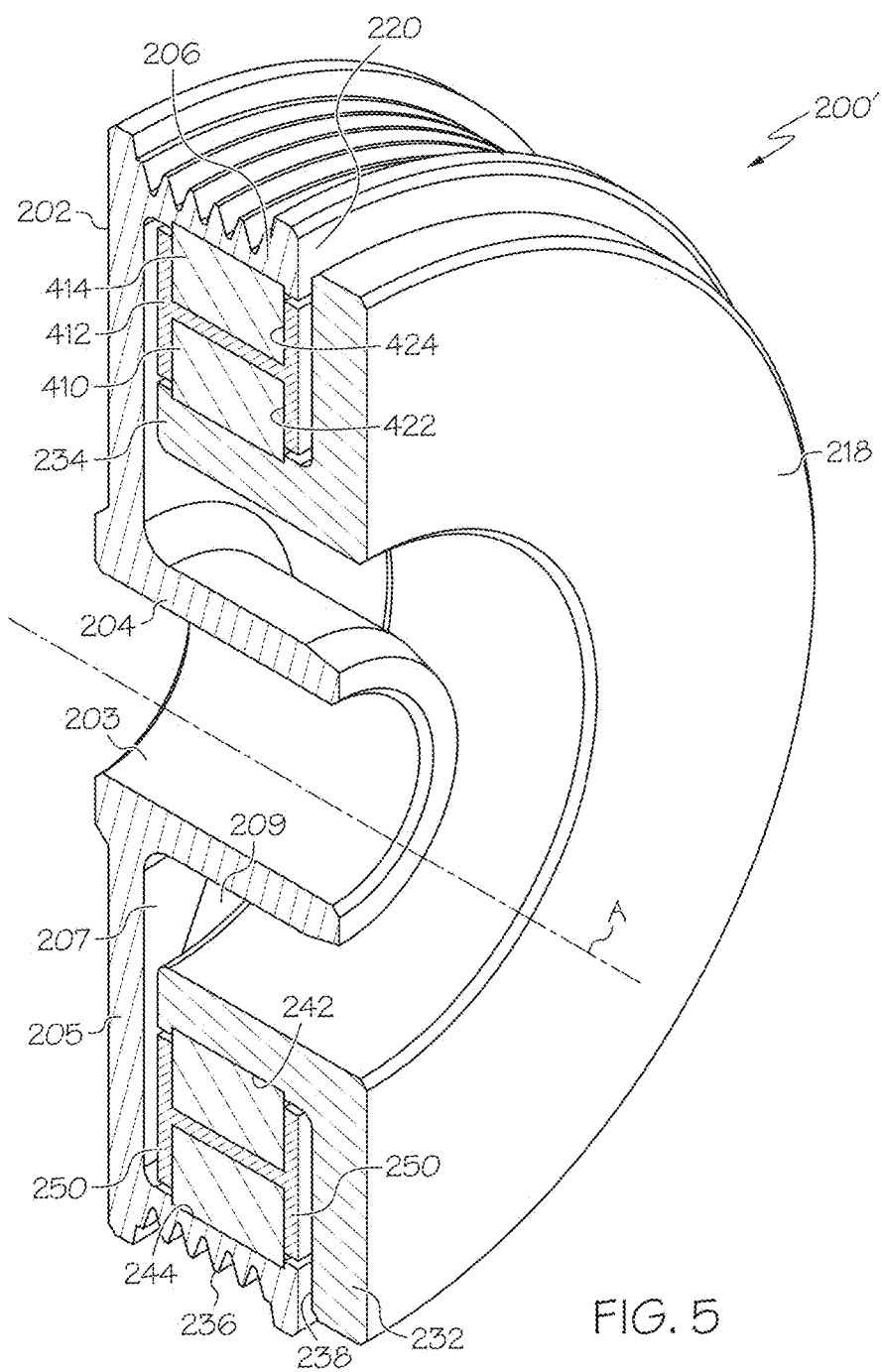

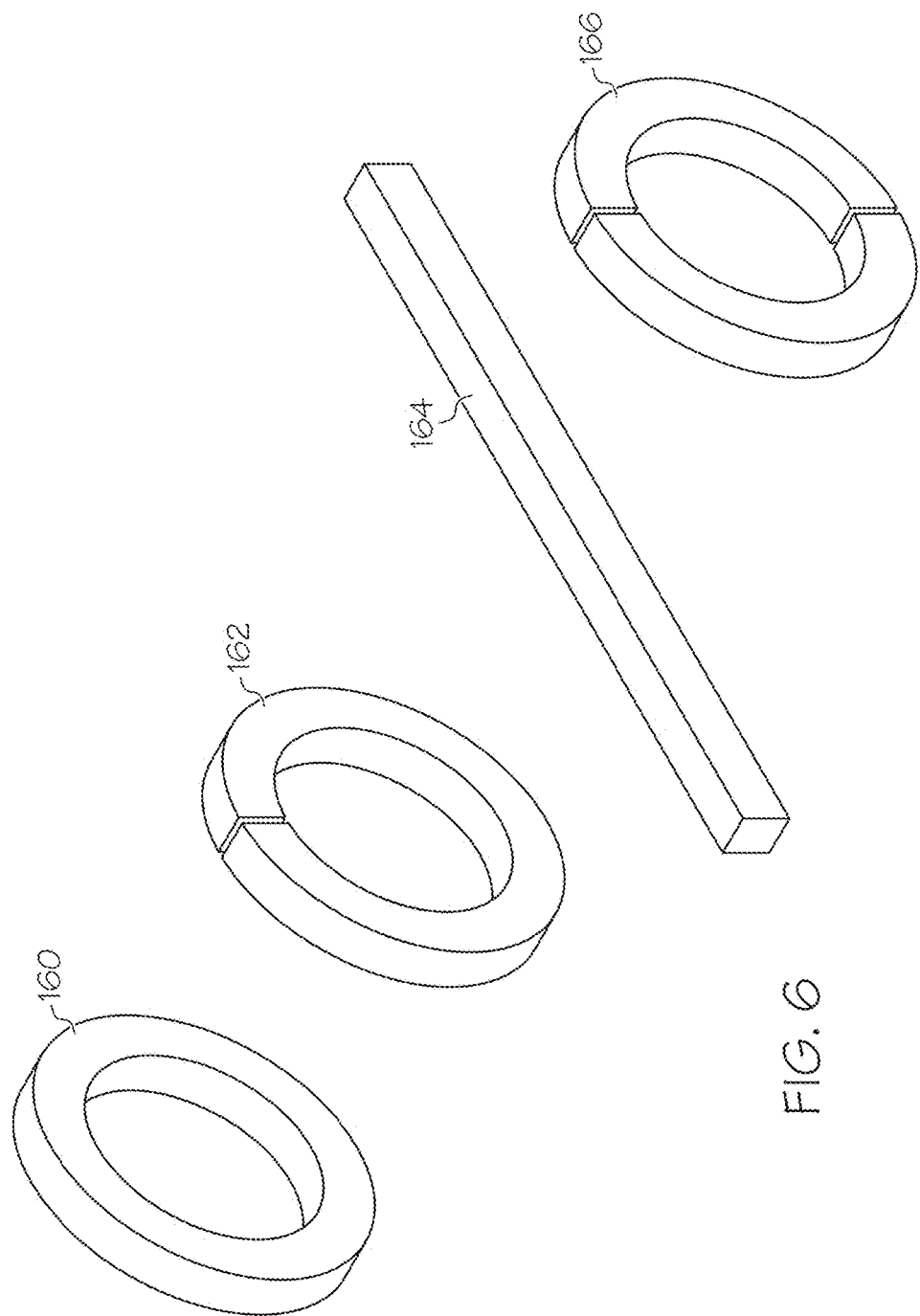

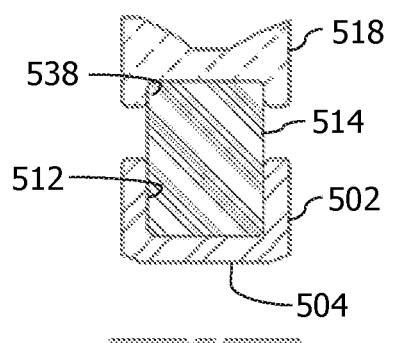
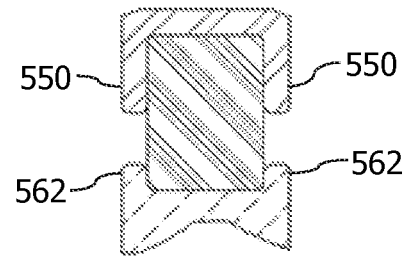
FIG. 9

APPARATUS FOR A DRIVE SYSTEM HAVING A CARTRIDGE HOUSING ONE OR MORE ELASTOMER MEMBERS

RELATED APPLICATIONS

This application claims the benefit of U.S. Provisional Application No. 62/044,534, filed Sep. 2, 2014, U.S. Provisional Application No. 62/044,540, filed Sep. 2, 2014, and U.S. Provisional Application No. 62/106,799, filed Jan. 23, 2015, each of which is incorporated herein by reference in its entirety.

FIELD OF DISCLOSURE

The present invention relates to apparatus for drive systems typically of vehicle engines and, more particularly, to torsional vibration dampers (TVDs) and/or isolators having an annular cartridge housing one or more elastomer members in a position concentric about the hub without a bearing system.

BACKGROUND

Originally, a crankshaft drove the front end assembly drive (FEAD) system of an engine. The crankshaft was turned by the firing of pistons, which exerted a rhythmic torque on the crankshaft, rather than being continuous. This constant application and release of torque caused vacillations, which would stress the crankshaft to the point of failure. Stated another way, the crankshaft is like a plain torsion-bar, which has a mass and a torsional spring rate, that causes the crankshaft to have its own torsional resonant frequency. The torque peaks and valleys plus the inertia load from the acceleration of the reciprocating components causes the crankshaft itself to deflect (rotationally) forward and backward while it is operating. When those pulses are near the crankshaft resonant frequency, they would cause the crank to vibrate uncontrollably and eventually break. Accordingly, a torsional vibration damper (sometimes referred to as a crankshaft damper) is mounted on the crankshaft to solve this problem by counteracting torque to the crank negating the torque twisting amplitude placed upon the crankshaft by periodic firing impulses and to transfer rotational motion into the FEAD system, typically by driving an endless power transmission belt.

While existing torsional vibration dampers have been effective to extend the life of the crankshaft and to drive the FEAD system, changes in vehicle engine operation such as the introduction of start-stop systems to conserve fuel consumption add complexities to the system that the existing torsional vibration dampers are not designed to address. For instance, the start-stop system introduces impact forces due to belt starts that introduce the potential slip in the elastomer-metal interface in traditional torsion vibration dampers. Another concern is maintaining good axial and radial run-outs between the metallic components.

Some torsional vibration dampers also include an isolator system. Some of these isolator systems use a rubber spring for isolation as well as one for the vibration damper. Typically, these isolator springs are mold-bonded to another component of the torsional vibration damper. Mold-bonding adds expense to the manufacturing process by requiring special equipment and time to accomplish the molding process. Elimination of this step or requirement would be beneficial.

Traditional torsional vibration damper isolators have a rubber spring either in pure shear or in tension and compression. Both do not afford the stability that is required to hold the joint together axially and typically included a bearing system to protect the isolator spring from axial motion because isolator springs needed to have a soft torsional stiffness. Accordingly, improved designs for torsional vibration dampers that have a simpler configuration that do not include a bearing system, and also, preferably, do not involve mold-bonding of the isolator springs are desirable.

SUMMARY

The limitations disclosed in the background section are overcome in the disclosed torsional vibration dampers. In one aspect, torsional vibration dampers include an isolator or a damper that includes an annular cartridge having one or more annular grooves that have generally C-shaped or U-shaped longitudinal cross-section profiles having an elastomer member seated in each of the one or more annular grooves in compression between the hub and a component for rotation with the hub. The torsional vibration dampers include a hub having a sleeve defining a bore for receiving a shaft, thereby defining an axis of rotation, and an outer annular ring spaced radially outward from the sleeve, thereby defining an annular receptacle therebetween, include a component for rotation with the hub, the component having an inner annular ring disposed between the sleeve and the outer annular ring of the hub, include an annular cartridge defining a first annular groove that has a generally C-shaped or U-shaped cross-sectional profile, the annular cartridge seated between the inner annular ring of the component for rotation with the hub and the sleeve or the outer annular ring of the hub with the first annular groove open radially outward and, include a first elastomer member seated in the first annular groove in compression, thereby operatively coupling the component for rotation with the hub to the hub for rotation therewith. Any of the TVDs may be used in a front end accessory drive system.

In one aspect, the component for rotation with the hub is a pulley body having a belt-engaging portion radially-concentric about the hub and radially-concentric about the inner annular ring. The inner annular ring is seated against a radially inner surface of the outer annular ring of the hub, and the first elastomer member is in compression against the inner annular ring of the pulley body. The radially inward surface of the inner annular ring may have an annular recess concentric about the axis of rotation in which the first elastomer member is seated. The torsional vibration damper may also include a damper assembly between the outer annular ring of the hub and the belt-engaging portion of the pulley body. The damper assembly has an elastomer damper member disposed in contact with the outer annular ring of the hub, and an inertia member seated against the elastomer damper member, thereby non-rigidly coupling the inertia member to the hub for rotation therewith.

In another aspect, the annular cartridge defines a second annular groove having a generally C-shaped or U-shaped cross-sectional profile open radially inward toward the axis of rotation, and has a second elastomer member seated in the second annular groove in compression, thereby assisting in operatively coupling the component for rotation with the hub to the hub. Here, the component for rotation with the hub may be a pulley body having a belt-engaging portion radially-concentric about the hub and radially-concentric about the inner annular ring. The inner annular ring is seated against a radially inner surface of the outer annular ring of the hub, the first elastomer member is in compression against the inner annular ring of the pulley body, and the second elastomer member is in compression against the sleeve of the hub. The radially inward surface of the inner annular ring may have an annular recess concentric about the axis of rotation in which the first elastomer member is seated, and the radially outward surface of the sleeve of the hub may have an annular recess concentric about the axis of rotation in which the second elastomer member is seated. The torsional vibration damper may also include a damper assembly between the outer annular ring of the hub and the belt-engaging portion of the pulley body. The damper assembly has an elastomer damper member disposed in contact with the outer annular ring of the hub, and an inertia member seated against the elastomer damper member, thereby non-rigidly coupling the inertia member to the hub for rotation therewith.

In another aspect, the component for rotation with the hub is an inertia member, and the first elastomer member is in compression against the outer annular ring of the hub. The radially inward surface of the outer annular ring of the hub may have an annular recess concentric about the axis of rotation in which the first elastomer member is seated. The outer annular ring of the hub may define an outer belt-engaging surface, and the hub may be a monolithic body. The inertia member has a flange extending radially outward from the inner annular ring, away from the axis of rotation, a distance that seats at least a portion of the flange on the back face surface of the outer annular ring of the hub.

In another aspect, the annular cartridge defines a second annular groove having a generally C-shaped or U-shaped cross-sectional profile open radially inward toward the axis of rotation, and has a second elastomer member seated in the second annular groove in compression, thereby assisting in operatively coupling the component for rotation with the hub to the hub. Here, the component for rotation with the hub is an inertia member, the first elastomer member is in compression against the outer annular ring of the hub, and the second elastomer member is in compression against the inner annular ring of the inertia member. The radially inward surface of the outer annular ring of the hub may have an annular recess concentric about the axis of rotation in which the first elastomer member is seated, and the radially outward surface of the inner annular ring of the inertia member may have an annular recess concentric about the axis of rotation in which the second elastomer member is seated. The outer annular ring of the hub may define an outer belt-engaging surface, and the hub may be a monolithic body. The inertia member has a flange extending radially outward from the inner annular ring, away from the axis of rotation, a distance that seats at least a portion of the flange on the back face surface of the outer annular ring of the hub.

In another aspect, isolators are disclosed that include a hub defining at least one annular groove having a generally C-shaped or U-shaped longitudinal cross-sectional profile open radially outward away from an axis of rotation, a body having an outer engaging surface radially-concentric about the hub and an inner surface, and an elastomer member seated in the annular groove in compression between the inner surface of the body and the hub. The outer engaging surface of the body may be a gear-engaging surface or a belt-engaging surface, and the elastomer member may be a plurality of portion defining an annular elastomer member that may have a plurality of axially extending bores therethrough between an inner diameter and an outer diameter thereof. Also, the hub may include a lip at each free end of the spaced apart flanges that define the annular groove, the body includes an annular receptacle for receiving each of the lips of the hub, and, in an assembled state, the lips are seated in the annular receptacles of the body with the elastomer isolator member in compression between the inner surface of the body and the hub. The hub is mountable on a shaft.

BRIEF DESCRIPTION OF DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a longitudinal cross-section view of a torsional vibration damper with an annular cartridge that is H-shaped for housing first and second elastomer members for damping vibrations.

FIG. 6 is a perspective view of the elastomer member as a closed annular ring, an open annular, and a straight strip of elastomer material.

FIG. 9 is an assembled, longitudinal cross-section of the isolator for a gear system of FIG. 8.

DETAILED DESCRIPTION

Figure 1:
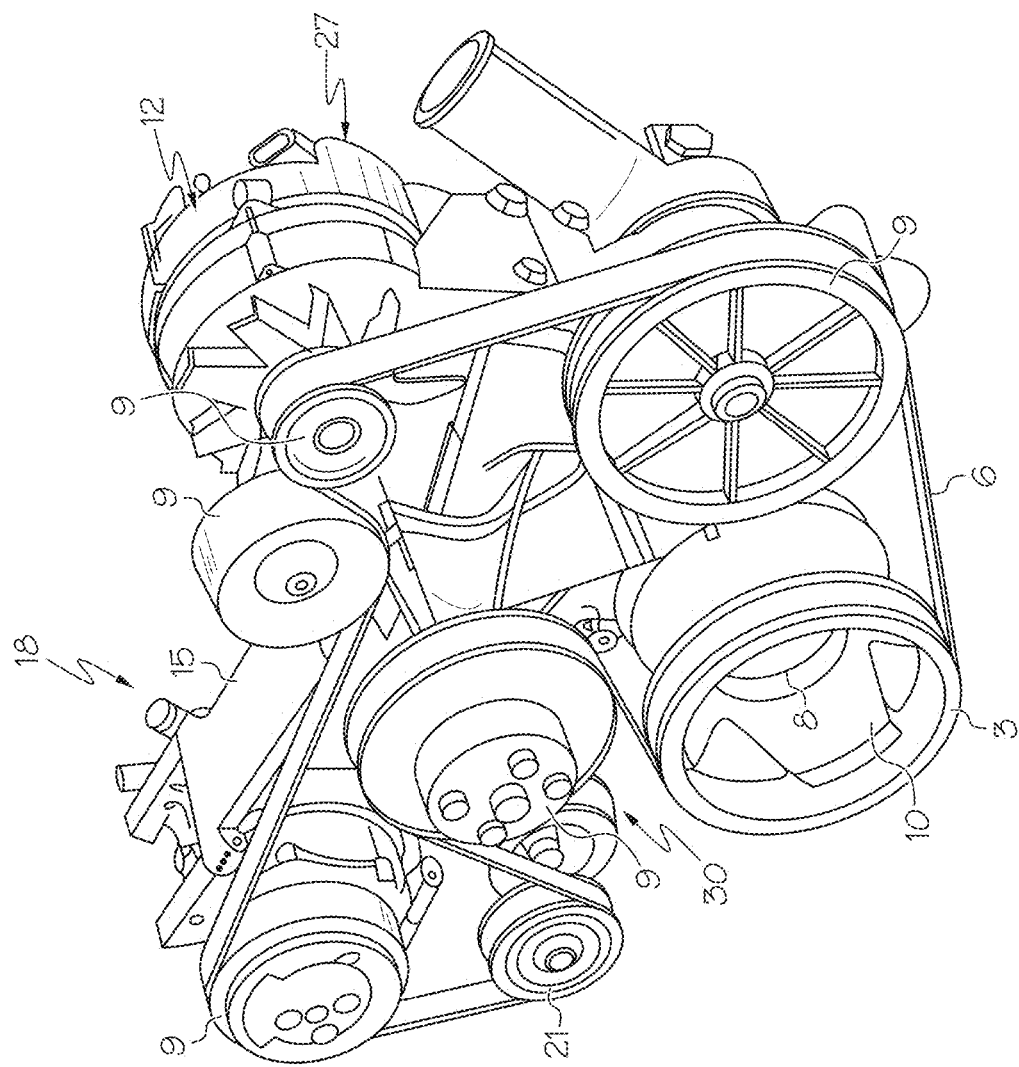
FIG. 1 is a perspective view of components in a front end accessory drive.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depend upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9, including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3, and, thereby, drives the endless drive belt 6, which in turn drives the remaining engine drive accessories 9 and the alternator 12.

Figure 2:
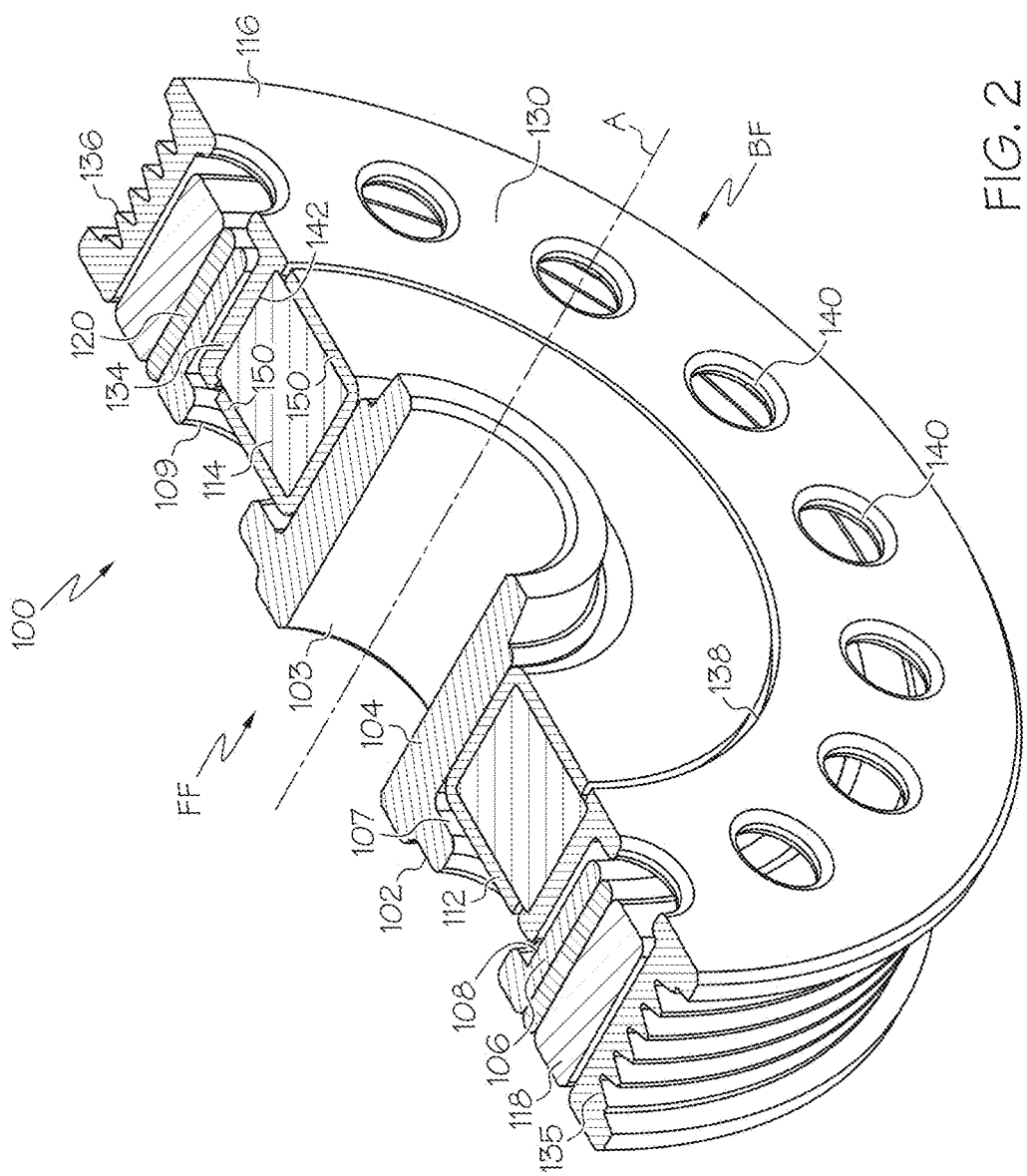
FIG. 2 is a longitudinal cross-section view of a torsional vibration damper having an isolator that includes an annular cartridge that is generally C-shaped or U-shaped for housing an elastomer member in compression between the hub and the pulley body.

The improvement to the FEAD system 18 herein is a new crankshaft damper-isolator, generally designated by reference 100 in FIG. 2. The crankshaft damper-isolator 100 includes from the center moving radially outward therefrom, a sleeve 104 of the hub 102, an annular cartridge 112, an elastomer isolator member 114, an inner annular ring 134 of a pulley body 116, an outer annular ring 106 of the hub 102, an elastomer damper member 120, an inertia member 118, and a belt-engaging surface 136 of the pulley body 116.

The hub 102 has a sleeve 104 defining a bore 103 for receiving a shaft, such as a crankshaft, thereby defining an axis of rotation A. The hub 102 also has an outer annular ring 106 concentric about and spaced radially outward from the sleeve 104. The outer annular ring 106 and sleeve 104 are connected by a plate 105, thereby defining an annular receptacle 107 therebetween. The hub 102 may be cast, spun, forged, machined, or molded using known or hereinafter developed techniques. Suitable material for the hub includes iron, steel, aluminum, other suitable metals, plastics, or a combination thereof, including composite materials. The plate 105 may define one or more voids 109 therethrough. The voids 109 may be any shape or size that reduces the overall weight of the TVD without compromising the structural integrity thereof. The sleeve 104 of the hub 102 defining the central bore 103 may extend axially in one primary direction from the plate 105, which in FIG. 2 is to the right toward the face guard 130 of the pulley body 116. Here, the plate 105 defines a front face FF of the crankshaft damper-isolator 100, which will receive the nose seal 10 (FIG. 1) fastening the crankshaft damper-isolator 100 to a shaft, such as a crankshaft, for rotation therewith.

The opposing face of the crankshaft damper-isolator 100, the back face BF, is defined by a face guard 130 of the pulley body 116 and a portion of the annular cartridge 112. The pulley body 116 includes a belt-engaging portion 135 radially-concentric about the hub 102 and, extending radially inward from the belt-engaging portion 135, the face guard 130, which terminates in an inner annular ring 134 defining a bore 138. The inner annular ring 134 extends axially in one primary direction from the face guard 130, which in FIG. 2 is to the left toward the plate 105 of the hub 102. The belt-engaging portion 135 defines an outermost surface of the TVD 100 disposed radially outward relative to the central axis of rotation A. The belt-engaging surface 136 may be flat, contoured to receive a rounded belt, or have V-grooves for mating with the V-ribs of a V-ribbed belt or any other required contoured groove to mate with an endless belt. The face guard 130 may define one or more voids 140. The voids 140 may be any shape or size that reduces the overall weight of the TVD without compromising the structural integrity thereof.

When assembled, the inner annular ring 134 is seated against a radially inner surface of the outer annular ring 106 of the hub 102 and the elastomer isolator member 114, which may be considered a spring, is seated in an annular groove of the annular cartridge 112 in radial compression against the pulley body's inner annular ring 134. The annular cartridge 112 has a generally C-shaped or U-shaped cross-sectional profile, as seen in the longitudinal cross-section of FIG. 2, seated in the annular receptacle 107, and the spaced apart annular flanges 150 of the annular cartridge 112 are oriented transverse to and extending radially outward away from the axis of rotation A.

The annular cartridge 112 is constructed of a stiff material that prevents the elastomer isolator member 114 from freely expanding axially. In one embodiment, the annular cartridge 112 includes or is made of a metallic material such as grey iron, steel, etc. Additionally, the compression of the elastomer isolator member 114 against the inner annular ring 134 also prevents the elastomer isolator member from freely expanding and, as a result, in combination with the annular cartridge 112, the elastomer isolator member exerts a large hydrostatic pressure on the interfaces. This large hydrostatic pressure is enough to hold these particular components of the TVD together without mold-bonding of the elastomer member to any of the other components.

Figure 4:
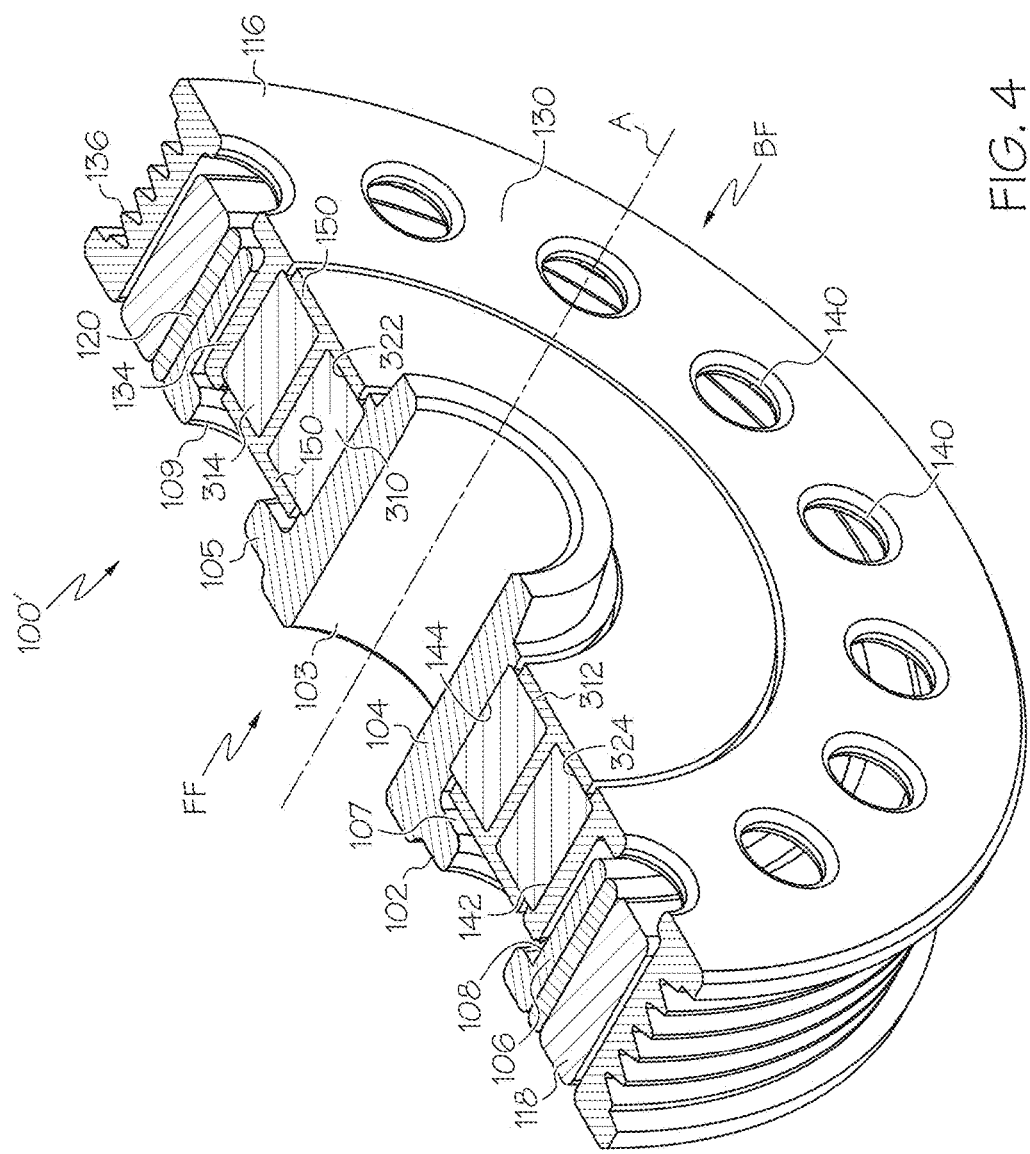
FIG. 4 is a longitudinal cross-section view of a torsional vibration damper having an isolator that includes an annular cartridge that is H-shaped for housing first and second elastomer members in compression between the hub and the pulley body.

Another possibility for the crankshaft damper-isolator 100 of FIG. 2 is a dual annular cartridge 312 shown in FIG. 4, rather than the single annular cartridge 112 of FIG. 2. In FIG. 4, the crankshaft damper-isolator 100' includes from the center moving radially outward therefrom, a sleeve 104 of the hub 102, a first elastomer isolator member 310, an annular cartridge 312, a second isolator member 314, an inner annular ring 134 of a pulley body 116, an outer annular ring 106 of the hub 102, an elastomer damper member 120, an inertia member 118, and a belt-engaging surface 136 of the pulley body 116. The hub 102 and pulley body 116 are as described above with respect to FIG. 2.

The plate 105 of the hub 102 defines the front face FF of the crankshaft damper-isolator 100' and the opposing face, the back face BF, is defined by the face guard 130 of the pulley body 116 and a portion of the annular cartridge 312. When assembled, the inner annular ring 134 is seated against a radially inner surface of the outer annular ring 106 of the hub 102, and the elastomer isolator members 310, 314, which may be considered as springs, are seated in the annular cartridge 312 in radial compression between the hub's sleeve 104 and the pulley body's inner annular ring 134. The annular cartridge 312 has a generally H-shaped cross-sectional profile. thereby defining two generally C-shaped or U-shaped cross-sectional profiled annular grooves that each receive an elastomer isolator member seated therein. The annular cartridge 312 is seated in the annular receptacle 107 with the annular flanges 150 of the H-shaped cross-sectional profile oriented transverse to the axis of rotation A. As shown in FIG. 4, the first elastomer isolator member 310 is seated in the radially inwardly facing annular groove 322 of the annular cartridge 312 in compression against the sleeve 104 of the hub 102, and the second elastomer isolator member 314 is seated in the radially outwardly facing annular groove 324 of the annular cartridge 312 in compression against inner annular ring 134 of the pulley body 116.

The annular cartridge 312 is constructed of a stiff material that prevents the first and second elastomer members 310, 314 from freely expanding axially. In one embodiment, the annular cartridge 312 includes or is made of a metallic material such as grey iron, steel, etc. Additionally, the compression of the first and second elastomers 310, 314 against the sleeve 104 and the inner annular ring 134, respectively, also prevents the elastomer members from freely expanding, and, as a result, in combination with the annular cartridge 112, the elastomer members exert large hydrostatic pressure on the interfaces. This large hydrostatic pressure is enough to hold the components of the TVD together without mold-bonding of the elastomer members and without the need for a bearing in the assembly.

Referring to FIGS. 2 and 4, the crankshaft damper-isolators 100, 100' include an elastomer damper member 120 disposed in contact with the outer annular ring 106 of the hub 102 and an inertia member 118 seated against the elastomer damper member 120, thereby operably coupling the inertia member 118 to the hub 102 for rotation therewith. The inertia member 118 may be made from any material having a sufficient inertia, usually cast iron, steel, or similar dense material. The inertia member 118 is concentric with and spaced radially outward from the hub 102 such that the outer annular ring 106 of the hub 102 faces an inner surface of the inertia member 118 and defines a gap therebetween. The elastomer damper member 120 may be press fit or injected into this gap so as to non-rigidly couple the hub 102 and the inertia member 118 together for rotation as a unit.

The elastomer isolator members 114, 310, 314 and the elastomer damper member 120 may be any suitable elastomer material suitable to isolate and/or absorb and/or dampen the torsional vibrations, as the case may be, generated by a rotating shaft upon which the crankshaft damper-isolator 100 is mounted. The elastomer material is preferably one suitable for automotive engine applications, i.e., suitable to withstand temperatures experienced in the engine and road temperatures and conditions. The elastomer material may be as disclosed in U.S. Pat. No. 7,658,127, which is incorporated herein, in its entirety, by reference. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomer member may be a composite material that optionally includes a plurality of fibers dispersed therein. The fibers may be continuous or fragmented (chopped) aramid fiber like the fiber sold under the name TECHNORA® fiber. In one embodiment, the elastomer damper member 120 may be attached to the outer annular ring 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Figure 7A:
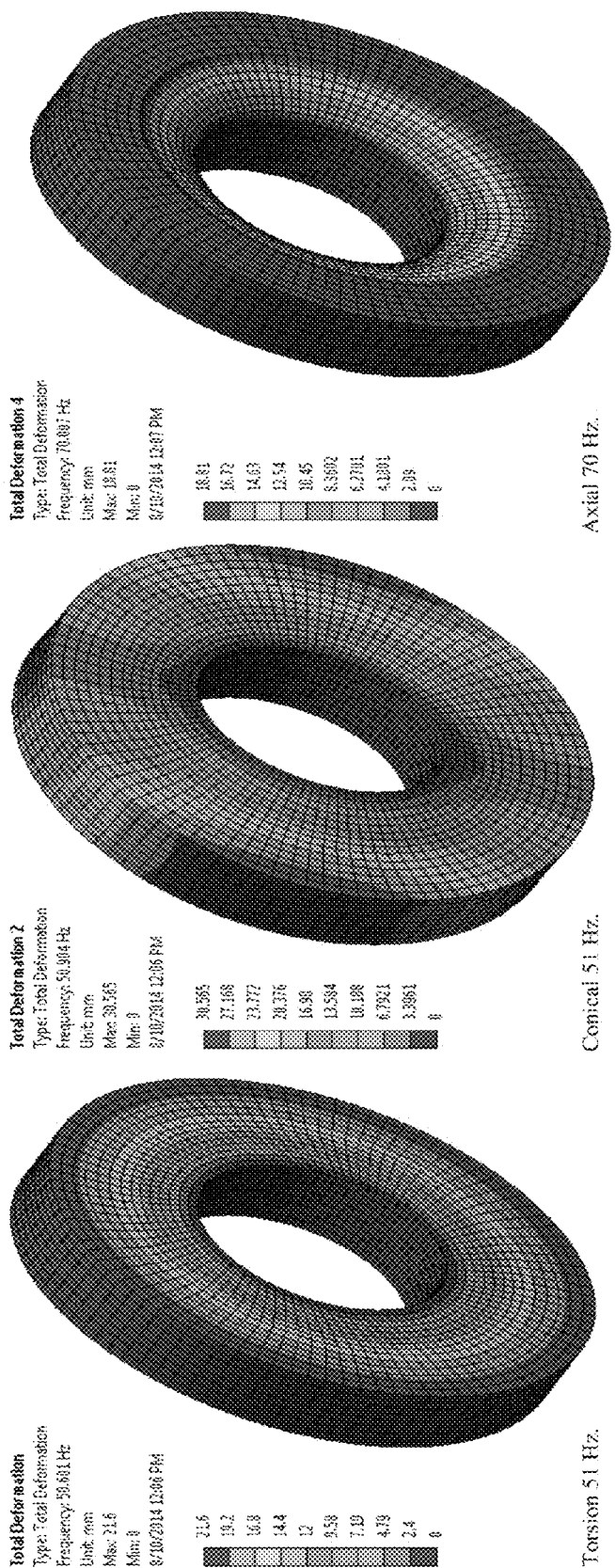
FIG. 7A is a modal plot that is normalized such that the color bands show the deformation magnitude and the mode shape of a prior art TVD having a single mold-bonded isolator elastomer member protected with a bearing system.
Figure 7B:
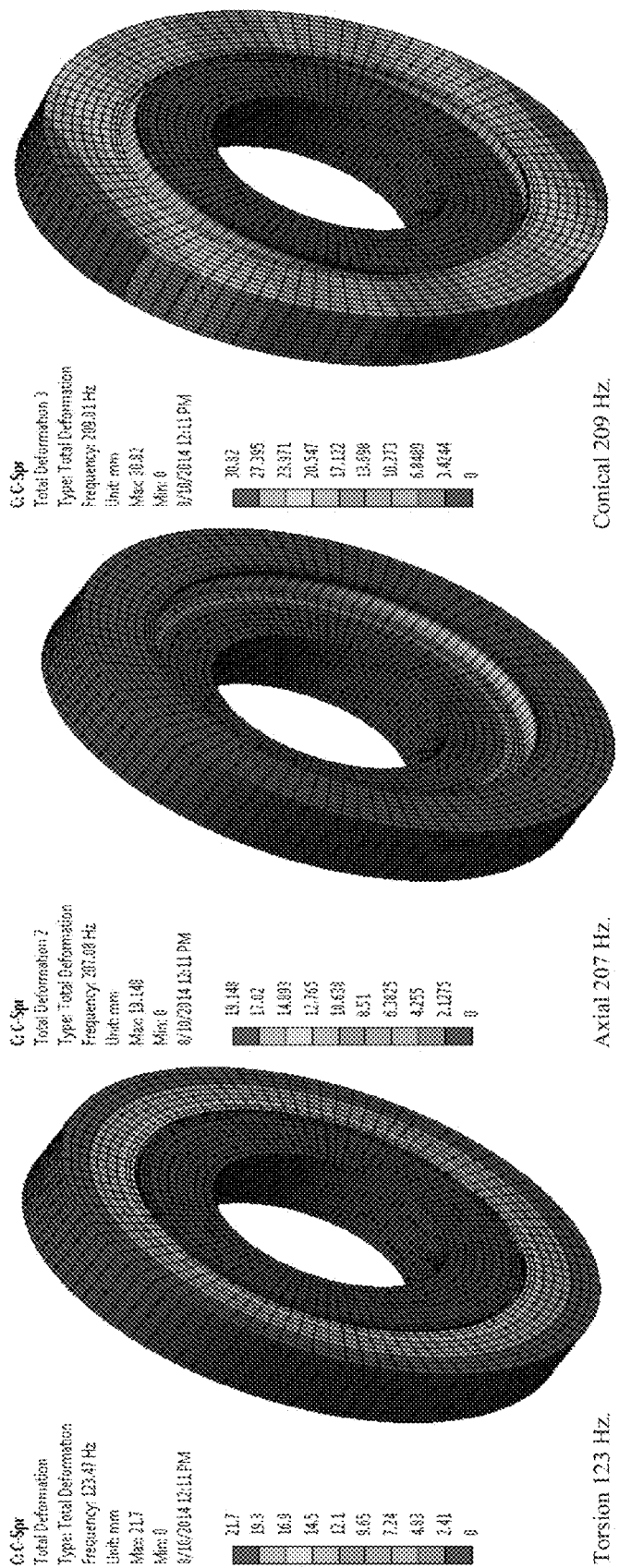
FIG. 7B is a modal plot that is normalized such that the color bands show the deformation magnitude and the mode shape of the TVD of FIG. 2.

Referring now to FIG. 7, the single annular cartridge 112 housing the elastomer isolator member 114 (FIG. 7B) results in a larger difference between the torsional spring stiffness and the non-torsional spring stiffness (primarily axial and conical stiffness) in comparison to a prior art TVD (FIG. 7A). FIGS. 7A and 7B are modal plots that are normalized such that the color bands show the deformation magnitude and the mode shape. The prior art TVD, FIG. 7A, has a soft conical and axial stiffness of about 50 Hz and 70 Hz, respectively, which is not desirable. The data shows that when an inertia member is attached to the single elastomer member, the torsional and conical modes overlap at about 50 Hz and the axial mode is only separated therefrom by about 20 Hz. This describes a soft non-torsional spring system that necessitates a bearing to prevent non-torsional motion of the elastomer member. In contrast, the modal plot of the TVD of FIG. 2 provided in FIG. 7B, has a large difference between the torsional stiffness at 123 Hz and the conical and axial stiffness, which are both greater than 200 Hz, i.e., there is no overlap of the torsional and conical modes, and the axial mode is much higher than the prior art TVD. The axial mode is more than 80 Hz greater than the torsional mode, but is similar to the axial mode (207 Hz for the axial mode and 209 Hz for the conical mode). This data demonstrates to one of skill in the art why the mold-bonding is not necessary and why a bearing system is also not necessary when using the annular cartridge 112 disclosed herein, having a generally C-shaped or U-shaped cross-sectional profile.

Figure 7C:
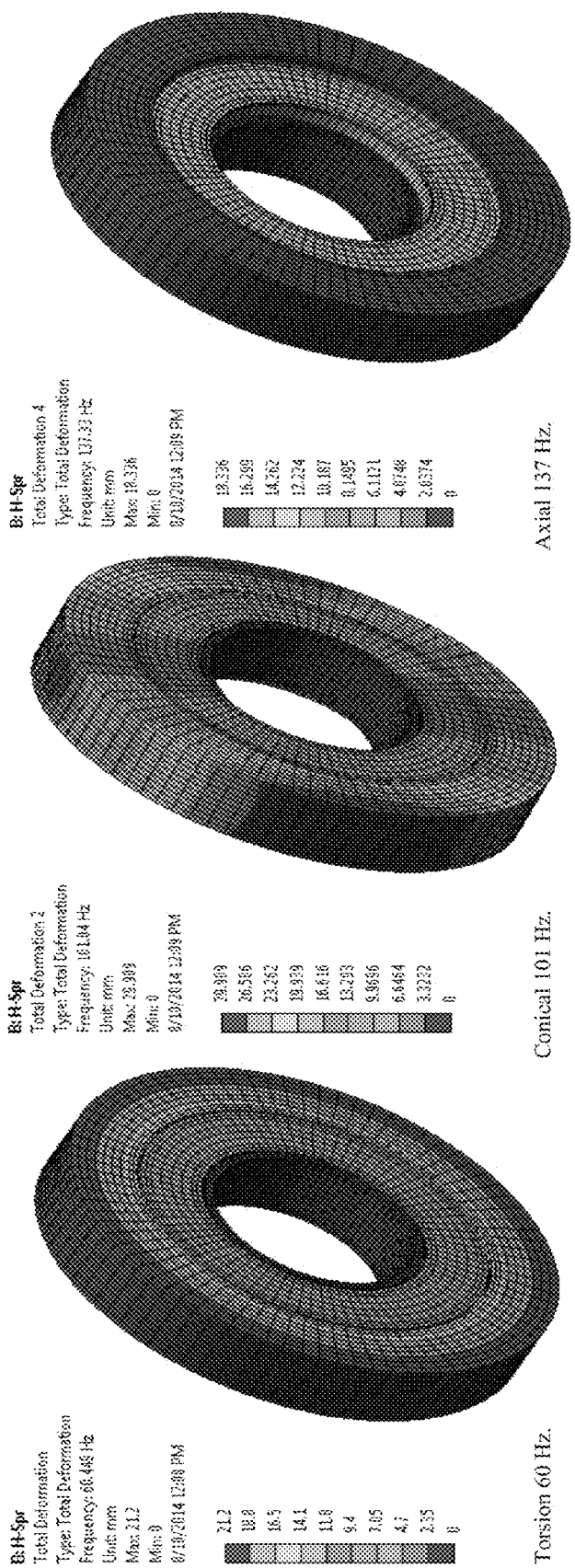
FIG. 7C is a modal plot that is normalized such that the color bands show the deformation magnitude and the mode shape of the TVD of FIG. 4.

Now referring to FIG. 7C, the dual annular cartridge 312 having the generally H-shaped cross-section profile housing the first and second elastomer members 310, 314 results in a larger difference between the torsional spring stiffness and the non-torsional spring stiffness (primarily axial and conical stiffness) in comparison to the prior art TVD of FIG. 7A. The prior art TVD, FIG. 7A, as explained above, has a soft conical and axial stiffness of about 50 Hz and 70 Hz, respectively, which is not desirable, because this is a soft non-torsional spring system that necessitates a bearing to prevent non-torsional motion of the elastomer member. In contrast, the modal plot of the TVD of FIG. 4 provided in FIG. 7B has a large difference between the torsional stiffness at 60 Hz and the conical and axial stiffness, which are both greater than 100 Hz, i.e., there is no overlap of the torsional and conical modes, and the axial mode is much higher than the prior art TVD and is more than 70 Hz greater than the torsional mode and more than 35 Hz greater than the conical mode. This data demonstrates to one of skill in the art why the mold-bonding is not necessary and why a bearing system is also not necessary when using the dual annular cartridge 312.

Figure 3:
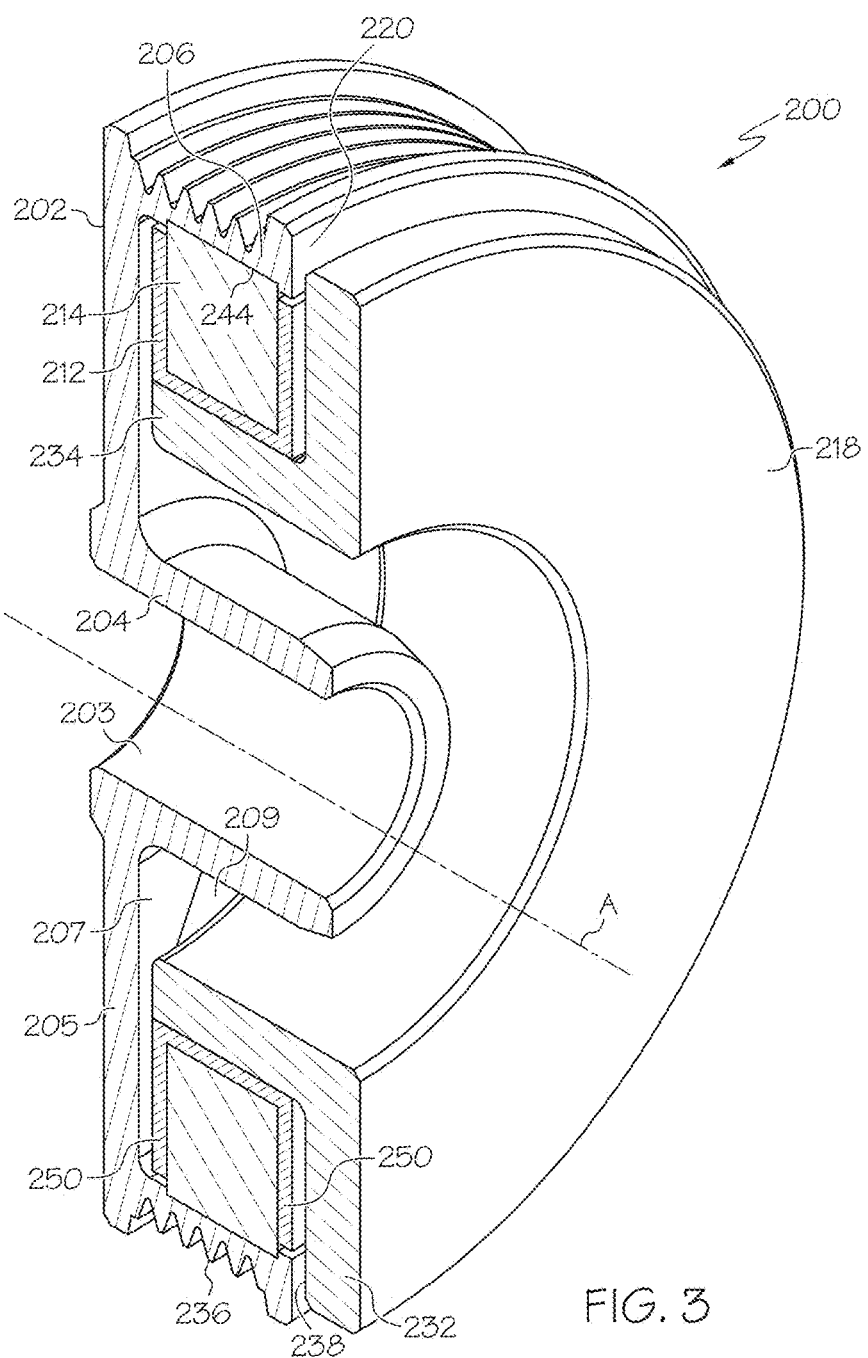
FIG. 3 is a longitudinal cross-section view of a torsional vibration damper with an annular cartridge that is generally C-shaped or U-shaped for housing an elastomer member for damping vibrations.

Turning now to FIG. 3, a torsional vibration damper, generally designated by reference number 200, that does not include an isolator system, but for its damping system has an annular cartridge 212, as described above with respect to FIG. 2, having a generally C-shaped or U-shaped cross-sectional profile housing an elastomer member 214, is depicted. The elastomer member 214 non-rigidly couples the inertia member 218 to the hub 202, together for rotation as a unit. The TVD 200 includes from the center moving radially outward therefrom, a sleeve 204 of the hub 202, an inertia member 218, an annular cartridge 212, an elastomer member 214, and an outer annular ring 206 of the hub 202 that defines a belt-engaging surface 236. The belt-engaging surface 236 is an outermost surface of the TVD 200 disposed radially outward relative to the central axis of rotation A. The belt-engaging surface 236 may be flat, contoured to receive a rounded belt, or have V-grooves for mating with the V-ribs of a V-ribbed belt or any other required contoured groove to mate with an endless belt. Here, the hub 204 is a monolithic body that includes the belt-engaging surface 236, rather than having a separate pulley body defining the belt-engaging surface as is evident in FIGS. 2 and 4.

The sleeve 204 of the hub 202 defines a bore 203 for receiving a shaft, such as a crankshaft, thereby defining an axis of rotation A. The hub 202 also has an outer annular ring 206 spaced radially outward from the sleeve 204 by a plate 205, thereby defining an annular receptacle 207 therebetween. The hub 202 may be cast, spun, forged, machined, or molded using known or hereinafter developed techniques. Suitable material for the hub includes iron, steel, aluminum, other suitable metals, plastics, or a combination thereof, including composite materials. The plate 205 may define one or more voids 209 therethrough. The voids 209 may be any shape or size that reduces the overall weight of the TVD without compromising the structural integrity thereof. The sleeve 204 defining the central bore 203 may extend axially in one primary direction from the plate 205, which in FIG. 3 is to the right. Here, the plate 205 defines a front face FF of the TVD 200.

The opposing back face BF of the TVD 200 is defined by a flange 232 of the inertia member 218. The flange 232 extends radially outward from an annular body or ring 234 of the inertia member 218, away from the axis of rotation A. The flange 232 extends a distance that seats its outermost, inner edge 238 on the back face surface 220 of the outer annular ring 206 of the hub 202. The annular body 234 of the inertia member 218 is disposed concentric about and spaced radially outward from the sleeve 204 of the hub 202, thereby defining a clearance gap between the annular body 234 and the sleeve 204. This construction of the inertia member 218, as illustrated in FIG. 3, has a generally L-shaped, longitudinal cross-sectional profile.

When assembled, the elastomer member 214, which may be considered a spring, is seated in the annular groove defined by the annular cartridge 212 and is in radial compression against the hub's outer annular ring 206. The annular cartridge 212 has a generally C-shaped or U-shaped cross-sectional profile seated in the annular receptacle 207 with the annular flanges 250 thereof oriented transverse to and extending radially outward away from the axis of rotation A.

The annular cartridge 212 is constructed of a stiff material that prevents the elastomer member 214 from freely expanding axially. In one embodiment, the annular cartridge 212 includes or is made of a metallic material such as grey iron, steel, etc. Additionally, the compression of the elastomer member 214 against the outer annular ring 206 of the monolithic hub 202 prevents the elastomer member from freely expanding radially and as a result, in combination with the annular cartridge 212, the elastomer member 214 exerts large hydrostatic pressure on the interfaces. The large hydrostatic pressure is enough to hold the particular components of the TVD together without mold-bonding of the elastomer members and without a bearing system preventing axial movement thereof.

The elastomer member 214 may be any elastomer material suitable to absorb and/or dampen the torsional vibrations, as the case may be, generated by a rotating shaft upon which the TVD 200 is mounted. The elastomer material is preferably one suitable for automotive engine applications, i.e., suitable to withstand temperatures experienced in the engine and road temperatures and conditions, and may be as described above with respect to FIG. 2.

Still referring to FIG. 2, the crankshaft damper-isolator 100 includes an elastomer damper member 120 disposed in contact with the outer annular ring 106 of the hub 102 and an inertia member 118 seated against the elastomer damper member 120, thereby operably coupling the inertia member 118 to the hub 102 for rotation therewith. The inertia member 118 may be made from any material having a sufficient inertia, usually cast iron, steel, or similar dense material. The inertia member 118 is concentric with and spaced radially outward from the hub 102 such that the outer annular ring 106 of the hub 102 faces an inner surface of the inertia member 118 and defines a gap therebetween. The elastomer damper member 120 may be press fit or injected into this gap so as to non-rigidly couple the hub 102 and the inertia member 118.

The elastomer isolator members 110, 114 and the elastomer damper member 120 may be any elastomer material suitable to isolate and/or absorb and/or dampen the torsional vibrations, as the case may be, generated by a rotating shaft upon which the crankshaft damper-isolator 100 is mounted. The elastomer material is preferably one suitable for automotive engine applications, i.e., suitable to withstand temperatures experienced in the engine and road temperatures and conditions. The elastomer material may be as disclosed in U.S. Pat. No. 7,658,127, which is incorporated herein, in its entirety, by reference. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomer member may be a composite material that optionally includes a plurality of fibers dispersed therein. The fibers may be continuous or fragmented (chopped) aramid fiber like the fiber sold under the name TECHNORA® fiber. In one embodiment, the elastomer damper member 120 may be attached to the outer annular ring 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Turning now to FIG. 3, a torsional vibration damper, generally designated by reference number 200, is shown that includes an elastomer member as its damping system, rather than as an isolator system. The TVD 200 has an annular cartridge 212 having an H-shaped cross-sectional profile housing a first and a second damping member 210, 214 that non-rigidly couple the inertia member 218 to the hub 202. The TVD 200 includes, from the center moving radially outward therefrom, a sleeve 204 of the hub 202, an inertia member 218, a first elastomer member 210, an annular cartridge 212, a second elastomer member 214, and an outer annular ring 206 of the hub 202 that defines a belt-engaging surface 236. The belt-engaging surface 236 is an outermost surface of the TVD 100 disposed radially outward relative to the central axis of rotation A. The belt-engaging surface may be flat, contoured to receive a rounded belt, or have V-grooves for mating with the V-ribs of a V-ribbed belt or any other required contoured groove to mate with an endless belt.

The sleeve 204 of the hub 202 defines a bore 203 for receiving a shaft, such as a crankshaft, thereby defining an axis of rotation A. The hub 202 also has an outer annular ring 206 spaced radially outward from the sleeve 204 by a plate 205, thereby defining an annular receptacle 207 therebetween. The hub 202 may be cast, spun, forged, machined, or molded using known or hereinafter developed techniques. Suitable material for the hub includes iron, steel, aluminum, other suitable metals, plastics, or a combination thereof, including composite materials. The plate 205 may define one or more voids 209 therethrough. The voids 209 may be any shape or size that reduces the overall weight of the TVD without compromising the structural integrity thereof. The sleeve 204 defining the central bore 203 may extend axially in only one direction from the plate 205, which in FIG. 3 is extending to the right. Here, the plate 205 defines a front face FF of the TVD 200.

The opposing back face BF of the TVD 200 is defined by a flange 232 of the inertia member 218. The flange 232 extends radially outward from an annular body 234 of the inertia member 218, away from the axis of rotation A. The flange 232 extends a distance that seats its outermost, inner edge 238 on the back face surface 220 of the outer annular ring 206 of the hub 202. The annular body 234 of the inertia member 218 is disposed concentric about and spaced radially outward from the sleeve 204 of the hub 202, thereby defining a clearance gap between the annular body 234 and the sleeve 204. This construction of the inertia member 218, as illustrated in FIG. 3, has a generally L-shaped, longitudinal cross-sectional profile.

When assembled, the first and second elastomer members 210, 214, which may be considered as springs, are seated in the annular cartridge 212 in radial compression between the hub's outer annular ring 206 and the annular body 234 of the inertia member 218. The annular cartridge 212 has an H-shaped cross-sectional profile seated in the annular receptacle 207 with the annular flanges 250 of the H-shaped cross-sectional profile oriented transverse to the axis of rotation A. The first elastomer member 210 is seated in one-half of the H-shaped annular cartridge 212, the lower half of the H, in compression against the annular body 234 of the inertia member 218, and the second elastomer member 214 is seated in the second-half of the annular cartridge 212, the upper half of the H, in compression against the outer annular ring 206 of the hub 202.

The annular cartridge 212 is constructed of a stiff material that prevents the first and second elastomer members 210, 214 from freely expanding axially. In one embodiment, the annular cartridge 212 includes or is made of a metallic material such as grey iron, steel, etc. Additionally, the compression of the first and second elastomers 210, 214 against the outer annular ring 206 of the hub 202 and the annular body 234 of the inertia member 218, respectively, also prevents the elastomer members from freely expanding and as a result, in combination with the annular cartridge 212, the elastomer members 210, 214 exert large hydrostatic pressure on the interfaces. The large hydrostatic pressure is enough to hold the particular components of the TVD together without mold-bonding of the elastomer members and without a bearing system preventing axial movement thereof.

Another possibility for the torsional vibration damper 200 of FIG. 3 is a dual annular cartridge 412 shown in FIG. 5, rather than a single annular cartridge 212. In FIG. 5, the TVD 200' includes from the center moving radially outward therefrom, a sleeve 204 of the hub 202, an inertia member 218, a first elastomer member 410, the annular cartridge 412, a second elastomer member 414, and an outer annular ring 206 of the hub 202 that defines a belt-engaging surface 236. The belt-engaging surface 236 is an outermost surface of the TVD 100 disposed radially outward relative to the central axis of rotation A. The belt-engaging surface may be flat, contoured to receive a rounded belt, or have V-grooves for mating with the V-ribs of a V-ribbed belt or any other required contoured groove to mate with an endless belt. The hub 202 and pulley body 216 are as described above with respect to FIG. 3.

When assembled, the first and second elastomer members 410, 414, which may be considered as springs, are seated in the annular cartridge 412 in radial compression between the hub's outer annular ring 206 and the annular body 234 of the inertia member 218. The annular cartridge 412 has a generally H-shaped cross-sectional profile, thereby defining two generally C-shaped or U-shaped cross-sectional profiled annular grooves 422, 424 that each receive an elastomer member seated therein. The annular cartridge 412 is seated in the annular receptacle 207 with the annular flanges 250 of the H-shaped cross-sectional profile oriented transverse to the axis of rotation A. As shown in FIG. 5, the first elastomer member 410 is seated in the radially inwardly facing annular groove 422 of the annular cartridge 412 in compression against the annular body 234 of the inertia member 218, and the second elastomer member 414 is seated in the radially outwardly facing annular groove 424 of the annular cartridge 412 in compression against the outer annular ring 206 of the hub 202.

The annular cartridge 412 is constructed of a stiff material that prevents the first and second elastomer members 410, 414 from freely expanding axially. The annular cartridge 212 may include or be made of a metallic material such as grey iron, steel, etc. Additionally, the compression of the first and second elastomers 410, 414 against the outer annular ring 206 of the hub 202 and the annular body 234 of the inertia member 218, respectively, prevents the elastomer members from freely expanding and as a result, in combination with the annular cartridge 412, the elastomer members 410, 414 exert large hydrostatic pressure on the interfaces. The large hydrostatic pressure is enough to hold the particular components of the TVD together without mold-bonding of the elastomer members and without a bearing system preventing axial movement thereof.

Figure 8:
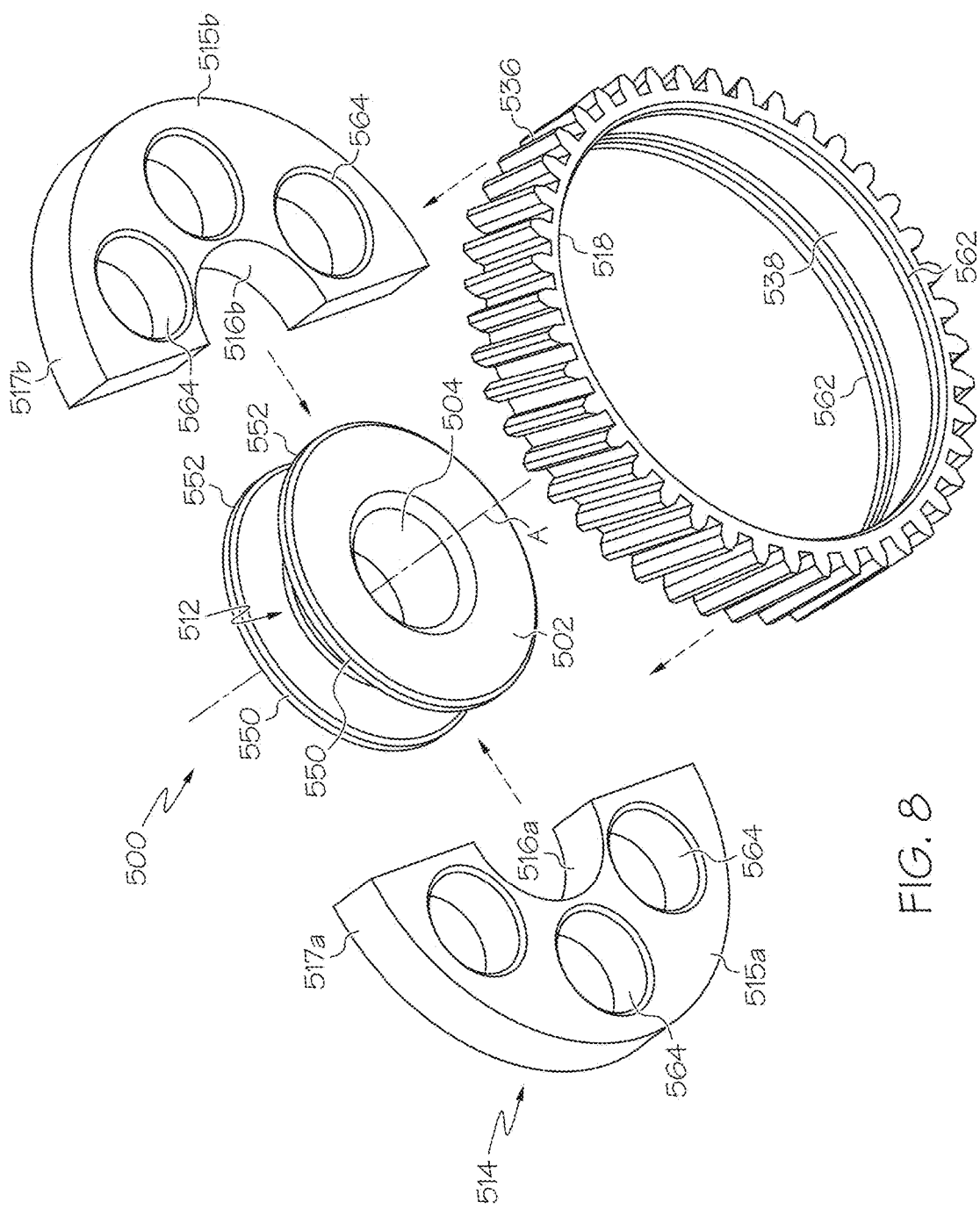
FIG. 8 is an exploded, front perspective view of an isolator for a gear system.

Turning to FIG. 8, an isolator, generally designated by reference number 500, is illustrated. The isolator 500 has a hub 502 that is an annular cartridge 512 having a generally C-shaped or U-shaped longitudinal cross-sectional profile that houses an elastomer member 514, here defined by a first elastomer portion 515a and a second elastomer portion 515b, which as shown are C-shaped members, seated in the annular cartridge 512 to define an annular member. Accordingly, the elastomer member 514 defines an inner diameter when the inner surfaces 516a, 516b are seated against the hub 502 within the annular cartridge 512, and the outer surfaces 517a, 517b define an outer diameter thereof. The elastomer member 514 is seated in the annular cartridge 512 in compression between the inner surface 538 of the body 518 and the annular cartridge 512, thereby non-rigidly coupling a body 518 to the hub 502 for rotation therewith. The isolator 500, in an assembled state, will include from the center moving radially outward therefrom, an inner annular ring 504 of the hub 502, the annular cartridge 512, an elastomer member 514 seated in the annular cartridge, and the body 518 defining an outer engaging surface 536. The outer engaging surface 536 is typically the outermost surface of the isolator 500, disposed radially outward relative to the central axis of rotation A. In this embodiment, the elastomer member may be mold-bonded to a component of the apparatus, such as the hub or the gear, especially if the apparatus is intended for use in an engine at a location subject to high temperatures and oil.

The inner annular ring 504 of the hub 502 defines a bore therethrough for receiving a shaft, thereby defining an axis of rotation A. The hub 502 also defines the annular cartridge 512 that has a generally C-shaped or U-shaped cross-sectional profile by having spaced apart, radially extending annular flanges 550 oriented transverse to the axis of rotation. The annular flanges 550 are spaced apart a selected distance to receive the elastomer member 514 therein. The free end of each of the annular flanges 550 may include a lip 552 for mating the hub 502 to the body 518.

The hub 502 may be cast, spun, forged, machined, or molded using known or hereinafter developed techniques. Suitable material for the hub includes iron, steel, aluminum, other suitable metals, plastics, or a combination thereof, including composite materials. The hub 502 may include voids, as described above, if necessary to reduce the weight thereof. The body 518 has an outer engaging surface 536 radially-concentric about the hub 502 and an inner surface 538. In one embodiment, the outer engaging surface 336 is a gear engaging surface. In another embodiment, the outer engaging surface may be a belt-engaging surface or a chain engaging surface and may be flat, contoured to receive a rounded belt, have V-grooves for mating with the V-ribs of a V-ribbed belt or have teeth for engaging links in a chain, or any other required contour, surface, or feature to mate with a desired component of a system. The inner surface 538 of the body 518 may include one or more annular receptacles 562 for mating with the hub 502, in particular with the annular lips 552 thereof. In an assembled state, the annular lips 552 of the hub 502 and the annular receptacles 562 of the body 518 are mated with the elastomer isolator member 514 in compression between the inner surface 538 of the body 518 and the annular cartridge 512 of the hub 502.

In one embodiment, the elastomer member 514 has a plurality of axially extending bores 564 therethrough disposed between the inner diameter and an outer diameter thereof. The bores 564 typically have a size generally smaller than the inner diameter of the elastomer isolator member 514. There may be any number of bores 564 therein.

Referring now to FIG. 6, any of the elastomer members in any of the disclosed constructions may be an endless annular ring 160, an open annular ring 162, or a straight strip 164 of elastomer material, a plurality of pieces that form an annular ring 166, or any combination thereof when two or more elastomer members are present in the TVD.

In any and all constructions disclosed herein, the surface of the hub, inertia member, or pulley body against which an elastomer member is compressed may include a recess into the surface in which the elastomer member is seated. For example, in FIG. 2, the radially inward surface of the inner radial ring 134 of the pulley body 116 includes an annular recess 142 in which the elastomer member 114 is seated. In FIG. 3, the radially inward surface of the outer annular ring 206 of the hub 202 includes an annular recess 244 in which the elastomer member 214 is seated. In FIG. 4, the radially inward surface of the inner radial ring 134 of the pulley body 116 includes an annular recess 142 in which the second elastomer member 314 is seated, and the radially outward surface of the sleeve 104 includes an annular recess 144 in which the first elastomer member 310 is seated. In FIG. 5, the radially inward surface of the outer annular ring 206 of the hub 202 includes an annular recess 244 in which the second elastomer member 414 is seated, and the radially outward surface of the inner annular ring 234 of the inertia member 218 includes an annular recess 242 in which the first elastomer member 410 is seated.

Furthermore, in any and all aspects disclosed herein, the elastomer members, regardless of whether functioning primarily as a damping mechanism or as an isolator, are axially supported by the cartridge in which the elastomer member(s) are seated while allowing torsional compliance adequate for the application of the apparatus in its respective drive system. In particular, isolators and low frequency torsional vibration dampers utilize a "soft" elastomer member, which in the past has required a bearing to hold the components together. The introduction of the cartridge to support these soft elastomer members eliminates the need for the bearing. A coupling is termed "soft" when it typically has a much lower torsional frequency than the shaft that it is mounted on or connected to.

Although the invention is shown and described with respect to certain embodiments, it is obvious that modifications will occur to those skilled in the art upon reading and understanding the specification, and the present invention includes all such modifications.

What is claimed is:

1. An apparatus for a drive system comprising:
   a monolithic hub having a sleeve defining a bore for receiving a shaft, thereby defining an axis of rotation, and an outer annular ring spaced radially outward from the sleeve, thereby defining an annular receptacle therebetween;
   a component for rotation with the hub, the component having an inner annular ring disposed between the sleeve and the outer annular ring of the hub;
   an annular cartridge defining a first annular groove that has a generally C-shaped or U-shaped cross-sectional profile, the annular cartridge seated between the inner annular ring of the component for rotation with the hub and the sleeve or the outer annular ring of the hub with the first annular groove open radially outward; and
   a first elastomer member seated in the first annular groove in compression, thereby operatively coupling the component for rotation with the hub to the hub for rotation therewith.

2. The apparatus for a drive system of claim 1, wherein the component for rotation with the hub is a pulley body having a belt-engaging portion radially-concentric about the hub and radially-concentric about the inner annular ring, wherein the inner annular ring is seated against a radially inner surface of the outer annular ring of the hub; and the first elastomer member is in compression against the inner annular ring of the pulley body.

3. The apparatus for a drive system of claim 2, further comprising a damper assembly between the outer annular ring of the hub and the belt-engaging portion of the pulley body, the damper assembly comprises:
   an elastomer damper member disposed in contact with the outer annular ring of the hub; and
   an inertia member seated against the elastomer damper member, thereby non-rigidly coupling the inertia member to the hub for rotation therewith.

4. The apparatus for a drive system of claim 2, wherein the radially inward surface of the inner annular ring comprises an annular recess concentric about the axis of rotation in which the first elastomer member is seated.

5. The apparatus for a drive system of claim 1, wherein the annular cartridge defines a second annular groove having a generally C-shaped or U-shaped cross-sectional profile open radially inward toward the axis of rotation, thereby collectively defining a generally H-shaped cross-sectional profile open radially inward and radially outward, and has a second elastomer member seated in the second annular groove in compression, thereby assisting in operatively coupling the component for rotation with the hub to the hub.

6. The apparatus for a drive system of claim 5, wherein the component for rotation with the hub is a pulley body having a belt-engaging portion radially-concentric about the hub and radially-concentric about the inner annular ring, wherein the inner annular ring is seated against a radially inner surface of the outer annular ring of the hub; and the first elastomer member is in compression against the inner annular ring of the pulley body, and the second elastomer member is in compression against the sleeve of the hub.

7. The apparatus for a drive system of claim 6, further comprising a damper assembly between the outer annular ring of the hub and the belt-engaging portion of the pulley body, the damper assembly comprises:
an elastomer damper member disposed in contact with the outer annular ring of the hub; and
an inertia member seated against the elastomer damper member, thereby non-rigidly coupling the inertia member to the hub for rotation therewith.

8. The apparatus for a drive system of claim 6, wherein the radially inward surface of the inner annular ring comprises an annular recess concentric about the axis of rotation in which the first elastomer member is seated, and the radially outward surface of the sleeve of the hub comprises an annular recess concentric about the axis of rotation in which the second elastomer member is seated.

9. The apparatus for a drive system of claim 1, wherein the component for rotation with the hub is an inertia member; and the first elastomer member is in compression against the outer annular ring of the hub.

10. The apparatus for a drive system of claim 9, wherein the outer annular ring of the hub defines an outer belt-engaging surface.

11. The apparatus for a drive system of claim 9, wherein the inertia member includes a flange extending radially outward from the inner annular ring, away from the axis of rotation, a distance that seats at least a portion of the flange on a back face surface of the outer annular ring of the hub.

12. The apparatus for a drive system of claim 9, wherein the radially inward surface of the outer annular ring of the hub comprises an annular recess concentric about the axis of rotation in which the first elastomer member is seated.

13. The apparatus for a drive system of claim 5, wherein the component for rotation with the hub is an inertia member, the first elastomer member is in compression against the outer annular ring of the hub, and the second elastomer member is in compression against the inner annular ring of the inertia member.

14. The apparatus for a drive system of claim 13, wherein the outer annular ring of the hub defines an outer belt-engaging surface.

15. The apparatus for a drive system of claim 13, wherein the inertia member includes a flange extending radially outward from the inner annular ring, away from the axis of rotation, a distance that seats at least a portion of the flange on a back face surface of the outer annular ring of the hub.

16. The apparatus for a drive system of claim 13, wherein the radially inward surface of the outer annular ring of the hub comprises an annular recess concentric about the axis of rotation in which the first elastomer member is seated, and the radially outward surface of the inner annular ring of the inertia member comprises an annular recess concentric about the axis of rotation in which the second elastomer member is seated.

17. A front end accessory drive system comprising the apparatus for a drive system of claim 1 mounted to a crankshaft or a driveline for rotation therewith.

18. An apparatus for a drive system comprising:
a hub having a sleeve defining a bore for receiving a shaft, thereby defining an axis of rotation, and an outer annular ring spaced radially outward from the sleeve and concentric about the sleeve, thereby defining an annular receptacle therebetween;
a pulley body for rotation with the hub, the pulley body having an inner annular ring concentric about the axis of rotation and disposed between the sleeve and the outer annular ring of the hub, and having a belt-engaging portion radially-concentric about the hub and radially-concentric about the inner annular ring;
wherein the inner annular ring of the pulley body is seated against a radially inner surface of the outer annular ring of the hub;
an annular cartridge defining a first annular groove that has a generally C-shaped or U-shaped cross-sectional profile, the annular cartridge seated between the inner annular ring of the pulley body and the sleeve of the hub with the first annular groove open radially outward; and
a first elastomer member seated in the first annular groove in compression against the inner annular ring of the pulley body, thereby operatively coupling the pulley body to the hub for rotation therewith;
wherein from the axis of rotation moving radially outward therefrom is the sleeve of the hub, the annular cartridge, the first elastomer member, the inner annular ring of the pulley body, the outer annular ring of the hub, and then the belt-engaging surface of the pulley body.

19. The apparatus for a drive system of claim 18, further comprising a damper assembly between the outer annular ring of the hub and the belt-engaging portion of the pulley body, the damper assembly comprises:
an elastomer damper member disposed in contact with the outer annular ring of the hub; and
an inertia member seated against the elastomer damper member, thereby non-rigidly coupling the inertia member to the hub for rotation therewith.

20. The apparatus of a drive system of claim 18, wherein the radially inward surface of the inner annular ring comprises an annular recess concentric about the axis of rotation in which the first elastomer member is seated.

* * * * *